(12) United States Patent
Xue et al.

(10) Patent No.: US 11,435,289 B2
(45) Date of Patent: Sep. 6, 2022

(54) OPTICAL DISTORTION MEASURING APPARATUS AND OPTICAL DISTORTION MEASURING METHOD, IMAGE PROCESSING SYSTEM, ELECTRONIC APPARATUS AND DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Hongzhen Xue, Beijing (CN); Fuqiang Ma, Beijing (CN); Yali Liu, Beijing (CN); Lili Chen, Beijing (CN); Jiankang Sun, Beijing (CN); Shuo Zhang, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 248 days.

(21) Appl. No.: 16/956,886

(22) PCT Filed: Jan. 2, 2020

(86) PCT No.: PCT/CN2020/070103
§ 371 (c)(1),
(2) Date: Jun. 22, 2020

(87) PCT Pub. No.: WO2020/164335
PCT Pub. Date: Aug. 20, 2020

(65) Prior Publication Data
US 2021/0247320 A1    Aug. 12, 2021

(30) Foreign Application Priority Data

Feb. 13, 2019  (CN) .................. 201910113048.6

(51) Int. Cl.
*G01N 21/66* (2006.01)
*G01M 11/02* (2006.01)
(Continued)

(52) U.S. Cl.
CPC ............ *G01N 21/66* (2013.01); *G01M 11/02* (2013.01); *G01N 21/8851* (2013.01);
(Continued)

(58) Field of Classification Search
USPC ............................................. 356/390
See application file for complete search history.

(56) References Cited

U.S. PATENT DOCUMENTS

2004/0233280 A1* 11/2004 Aoyama ............... H04N 7/181
                                                348/E7.086
2006/0110050 A1*  5/2006 Aoyama .............. G06T 3/0018
                                                348/E5.078
(Continued)

FOREIGN PATENT DOCUMENTS

CN      1897715 A  *  1/2007
CN      1897715 A     1/2007
(Continued)

OTHER PUBLICATIONS

Office Action dated Feb. 3, 2020, issued in counterpart CN Applicatino No. 201910113048.6, with English translation (28 pages).
(Continued)

*Primary Examiner* — Chineyere D Wills-Burns
(74) *Attorney, Agent, or Firm* — WHDA, LLP

(57) ABSTRACT

An optical distortion measurement method that including receiving target field of view information; processing the
(Continued)

target field of view information using a coordinate conversion model to obtain screen coordinates of a target angle of view, wherein the coordinate conversion model may be configured to convert image plane coordinates of the target angle of view to screen coordinates of the target angle of view; and outputting at least the screen coordinates of the target angle of view.

18 Claims, 12 Drawing Sheets

(51) Int. Cl.
    *G01N 21/88*     (2006.01)
    *H04N 9/31*     (2006.01)
    *G02B 27/01*     (2006.01)
    *G06T 5/00*     (2006.01)

(52) U.S. Cl.
    CPC ... *H04N 9/3191* (2013.01); *G01N 2021/8887* (2013.01); *G02B 27/0172* (2013.01); *G02B 2027/014* (2013.01)

(56) References Cited

U.S. PATENT DOCUMENTS

| | | | | |
|---|---|---|---|---|
| 2013/0235082 | A1* | 9/2013 | Furui | H04N 9/3194 345/647 |
| 2018/0328718 | A1* | 11/2018 | Masuda | H04N 5/2226 |
| 2018/0365898 | A1* | 12/2018 | Costa | G06F 3/038 |
| 2019/0066334 | A1* | 2/2019 | Gu | G06T 7/80 |
| 2019/0122378 | A1* | 4/2019 | Aswin | G06T 5/003 |
| 2021/0166486 | A1* | 6/2021 | Kim | G06V 40/107 |

FOREIGN PATENT DOCUMENTS

| | | |
|---|---|---|
| CN | 104034514 A | 9/2014 |
| CN | 104363986 A | 2/2015 |
| CN | 105427241 A | 3/2016 |
| CN | 106127714 A | 11/2016 |
| CN | 107369132 A | 11/2017 |
| CN | 108876725 A | 11/2018 |
| CN | 109191374 A | 1/2019 |
| CN | 109799073 A | 5/2019 |
| KR | 20120080554 A | 7/2012 |

OTHER PUBLICATIONS

Office Action dated Oct. 16, 2020, issued in counterpart CN Applicatino No. 201910113048.6, with English translation (33 pages).

International Search Report dated Mar. 27, 2020, issued in counterpart Application No. PCT/CN2020/070103 (11 pages).

Office Action dated Apr. 9, 2021, issued in counterpart CN Application No. 201910113048.6, with English Translation. (27 pages).

* cited by examiner

_US 11,435,289 B2_

OPTICAL DISTORTION MEASURING APPARATUS AND OPTICAL DISTORTION MEASURING METHOD, IMAGE PROCESSING SYSTEM, ELECTRONIC APPARATUS AND DISPLAY APPARATUS

CROSS-REFERENCE TO RELATED APPLICATIONS

This application claims benefit of the filing date of Chinese Patent Application No. 201910113048.6 filed on Feb. 13, 2019, the disclosure of which is hereby incorporated in its entirety by reference.

TECHNICAL FIELD

The present disclosure relates to the field of display technologies, and in particular, to an optical distortion measuring apparatus and an optical distortion measuring method, an image processing system, an electronic apparatus, and a display apparatus.

BACKGROUND

Virtual Reality (VR) is a computer simulation method that can enable a user to create and experience virtual worlds. In the VR display, the user can immerse her in the immersive environment provided by the VR display, thereby giving the user a more realistic experience.

An optical lens is usually employed in the VR display apparatus to provide a true immersive environment to the user, but the image is distorted after being processed by the optical lens. Therefore, the image displayed by the VR display apparatus needs to be subjected to anti-distortion processing.

BRIEF SUMMARY

An embodiment of the present disclosure provides an optical distortion measurement method. The method includes receiving target field of view information; processing the target field of view information using a coordinate conversion model to obtain screen coordinates of a target angle of view, wherein the coordinate conversion model may be configured to convert image plane coordinates of the target angle of view to screen coordinates of the target angle of view; and outputting at least the screen coordinates of the target angle of view.

Optionally, processing the target field of view information using the coordinate conversion model to obtain the screen coordinates of the target angle of view, comprising obtaining the image plane coordinates of the target angle of view; and processing the image plane coordinates of the target angle of view using the coordinate conversion model to obtain the screen coordinates of the target angle of view.

Optionally, outputting at least the screen coordinates of the target angle of view, further comprising outputting the image plane coordinates of the target angle of view.

Optionally, the optical distortion measuring method, before the receiving the target field of view information, further comprises receiving distortion sample information, which comprises image plane sample coordinates of a plurality of sample angles of view and corresponding screen sample coordinates; training a neural network as the coordinate conversion model using the distortion sample information; and storing the coordinate conversion model.

Optionally, the optical distortion measuring method further comprises receiving image size information after receiving the distortion sample information; the image size information comprising $M_0$ pixels along X axis direction of a screen coordinate system and $N_0$ pixels along Y axis direction of the screen coordinate system; and performing normalization processing on the distortion sample information, so that the image plane sample coordinates included in the distortion sample information before the normalization processing are $(X_{s10}, Y_{s10})$, the image plane sample coordinates included in the distortion sample information after the normalization processing are $(X_{s1}, Y_{s1})$, the screen sample coordinates included in the distortion sample information before the normalization processing are $(X_{p10}, Y_{p10})$, the screen sample coordinates included in the distortion sample information after the normalization processing are $(X_{p1}, Y_{p1})$; wherein $X_{s1}=X_{s10}/M_0$, $Y_{s1}=Y_{s10}/N_0$, $X_{p1}=X_{p10}/M_0$, $Y_{p1}=Y_{p10}/N_0$.

Optionally, an activation function f(y) of the neural network is $$f(y) = \frac{1}{1+e^{-y}};$$

y is an input value of a neuron; a loss function of the neural network $E_{total}$ is $$E_{total} = \frac{\sum_{i=1}^{n}(T_i - O_i)}{n},$$

n is a number of neurons in a last layer of neurons, i is the i-th neuron contained in the last layer of neurons, $T_i$ is an actual output value of the i-th neuron contained in the last layer of neurons, and $O_i$ is a predicted output value of the i-th neuron contained in the last layer of neurons.

One embodiment of the present disclosure is an electronic apparatus, comprising: a processor and a memory, wherein the memory stores calculation instruction, the processor is configured to execute the calculation instructions to perform the optical distortion measurement method according to one embodiment of the present disclosure.

One embodiment of the present disclosure is a display apparatus, comprising the electronic apparatus according to one embodiment of the present disclosure.

One embodiment of the present disclosure is an optical distortion measuring apparatus, comprising a receiving module, configured to receive target field of view information; a processing module, configured to process the target field of view information using a coordinate conversion model to obtain screen coordinates of a target angle of view, the coordinate conversion model is configured to convert image plane coordinates of the target angle of view to the screen coordinates of the target angle of view; and a coordinate output module, configured to output at least the screen coordinates of the target angle of view.

Optionally, the processing module is configured to obtain the image plane coordinates of the target angle of view, and process the image plane coordinates of the target angle of view using the coordinate conversion model to obtain the screen coordinates of the target angle of view.

Optionally, the coordinate output module is further configured to output the image plane coordinates of the target angle of view.

Optionally, the receiving module is further configured to receive distortion sample information before receiving the target field of view information, the distortion sample information comprising image plane sample coordinates of a plurality of sample angles of view and corresponding screen sample coordinates; the processing module is further configured to train a neural network as the coordinate conversion model using the distortion sample information; and the optical distortion measuring apparatus further comprising a model storage module for storing the coordinate conversion model.

Optionally, the receiving module is further configured to receive image size information after receiving the distortion sample information, the image size information comprising $M_0$ pixels along X axis direction of a screen coordinate system and $N_0$ pixels along Y axis direction of the screen coordinate system; the processing module is further configured to perform normalization processing on the distortion sample information before training the neural network, so that the image plane sample coordinates included in the distortion sample information before the normalization processing are $(X_{s10}, Y_{s10})$, the image plane sample coordinates included in the distortion sample information after the normalization processing are $(X_{s1}, Y_{s1})$; the screen sample coordinates included in the distortion sample information before the normalization processing are $(X_{p10}, Y_{p10})$, the screen sample coordinates included in the distortion sample information after the normalization processing are $(X_{p1}, Y_{p1})$; wherein $X_{s1}=X_{s10}/M_0$, $Y_{s1}=Y_{s10}/No$, $X_{p1}=X_{p10}/M_0$, $Y_{p1}=Y_{p10}/N_0$.

Optionally, an activation function f(y) of the neural network is $$f(y) = \frac{1}{1+e^{-y}};$$

y is an input value of a neuron; a loss function of the neural network $E_{total}$ is $$E_{total} = \frac{\sum_{i=1}^{n}(T_i - O_i)}{n},$$

n is a number of neurons in a last layer of neurons, i is the i-th neuron contained in the last layer of neurons, $T_i$ is an actual output value of the i-th neuron contained in the last layer of neurons, and $O_i$ is a predicted output value of the i-th neuron contained in the last layer of neurons.

Optionally, the optical distortion measuring apparatus further comprises a distortion calculation module, wherein an input of the distortion calculation module is coupled to the coordinate output module, and configured to calculate a distortion coefficient of an optical lens according to the image plane coordinates of a plurality of target angles of view and the corresponding screen coordinates.

One embodiment of the present disclosure is an image processing system, comprising a sample collection apparatus and the optical distortion measurement apparatus according to one embodiment of the present disclosure, wherein the sample collection apparatus is configured to provide the distortion sample information to the optical distortion measurement apparatus; the sample collection apparatus comprising a display setting module, configured to set the screen sample coordinates of the plurality of sample angles of view; a sample collection assembly, comprising a display screen, an image collector, and an optical lens located between the display screen and the image collector; wherein the display screen is configured to display a plurality of screen sample spots according to the screen sample coordinates of the plurality of sample angles of view, the image collector is configured to collect a plurality of imaging sample spots formed after the plurality of screen sample spots passing through the optical lens; an image analysis module, configured to analyze the image plane sample coordinates of the plurality of sample angles of view according to the plurality of imaging sample spots; and a sample output module connected to the receiving module included in the optical distortion measuring apparatus, configured to transmit the screen sample coordinates of the plurality of sample angles of view and the corresponding image plane sample coordinates as the distortion sample information to the receiving module.

Optionally, an optical axis of the optical lens, an optical axis of a lens of the image collector, and a geometric center of the display screen are coaxial.

Optionally, the display setting module is configured to set screen coordinates of testing angles of view before setting the screen sample coordinates of the plurality of sample angles of views; the display screen is configured to obtain a screen test spot according to the screen coordinates of the testing angles of view; the image collector is further configured to collect an image testing spot formed by the screen testing spot after passing through the optical lens; and the image analysis module is further configured to test the image plane coordinates of the angle of view according to the image testing spot analysis; distortion the lens of the image collector is corrected based on the screen coordinates of the testing angle of view and the image plane coordinates of the testing angles of view.

BRIEF DESCRIPTION OF THE DRAWINGS

The drawings described herein are intended to provide a further understanding of the disclosure, and are intended to be a part of the disclosure. The illustrative embodiments of the present disclosure and the description thereof are intended to explain the present disclosure and are not intended to limit the disclosure. In the drawings.

DETAILED DESCRIPTION

Figure 1:
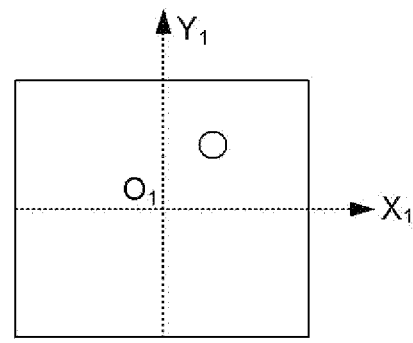
FIG. 1 is a schematic diagram of a screen coordinate system.

The technical solutions in the embodiments of the present disclosure are clearly and completely described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without creative efforts are within the scope of the present disclosure.

In the description of the present specification, the description with reference to the terms "one embodiment", "some embodiments", "example", "specific example", or "some examples" and the like means a specific feature described in connection with the embodiment or example. A structure, material or feature is included in at least one embodiment or example of the disclosure. In the present specification, the schematic representation of the above terms is not necessarily directed to the same embodiment or example. Furthermore, the particular features, structures, materials, or characteristics described may be combined in a suitable manner in any one or more embodiments or examples. In addition, those skilled in the art can combine and combine the different embodiments or examples described in the specification and the features of different embodiments or examples, without contradicting each other.

In the related art, before performing image distortion processing, it is necessary to determine image plane coordinates of each angle of view and corresponding screen coordinates, and then obtain actual distortion parameters of the optical lens based on the image plane coordinates of each angle of view and the corresponding screen coordinates. When calculating the image plane coordinates of each angle of view and the corresponding screen coordinates, it is necessary to obtain the image plane coordinates of the required angle of view and the corresponding screen coordinates by means of data fitting based on the image coordinates of a plurality of angles of view and the corresponding screen coordinates provided by the optical lens manufacturer. However, this method requires not only a large amount of distortion data searches of the angle of view, but also requires data fitting, which makes the image rendering speed relatively low and is not conducive to the improvement of image quality.

The VR display apparatus is provided with an optical lens, which is a magnifying lens with a curvature and can project an image displayed by the VR display apparatus into eyes of the user so that the visual range of the user is as large as possible. This can increase the user's environmental immersion, but it also causes a certain distortion of the image projected into the user's eyes. This phenomenon is called image distortion. Therefore, before the VR display apparatus displays the image, it is necessary to perform the anti-distortion processing on the image by utilizing distortion parameters of the optical lens. Therefore, how to solve the distortion parameters of the optical lens has an important influence on the anti-distortion processing of the image.

When solving the distortion coefficient of the optical lens, it is necessary to calculate coordinates of each pixel in an image on the screen of the VR display apparatus and coordinates of a virtual image formed by each pixel after passing through the optical lens.

As shown in FIG. 1, the coordinates of each pixel on the screen of the VR display apparatus are defined as screen coordinates, and the screen coordinate system $X_1O_1Y_1$ where the screen coordinates are located is a two-dimensional coordinate system. The screen coordinate system $X_1O_1Y_1$ is located on the plane where a display surface of the screen is located. The screen coordinate system $X_1O_1Y_1$ takes the geometric center $O_1$ of the screen as the origin of the screen coordinates, and the horizontal direction of the screen is the $X_1$ axis, and the vertical direction of the screen is the $Y_1$ axis.

Figure 2:
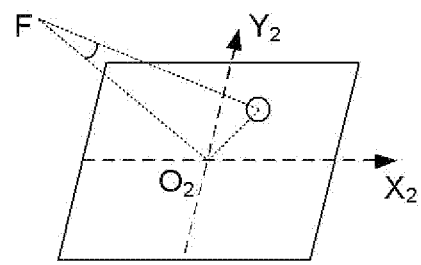
FIG. 2 is a schematic diagram of an image plane coordinate system.

As shown in FIG. 2, the coordinates of the virtual image formed by each pixel passing through the optical lens are defined as image plane coordinates, where the coordinate system of the image plane coordinates is called the image plane coordinate system $X_2O_2Y_2$. The image coordinate system $X_2O_2Y_2$ is a two-dimensional coordinate system located on the plane where the virtual image formed by the image passing through the optical lens is located. The image plane coordinate system $X_2O_2Y_2$ takes the geometric center $O_2$ of the virtual image as the origin of the image plane coordinates, and the horizontal direction of the virtual image is the $X_2$ axis, and the vertical direction of the virtual image is the $Y_2$ axis.

As shown in FIGS. 1 and 2, in order to facilitate solving the distortion coefficient of the optical lens, the positive direction of the $X_1$ axis of the screen coordinate system is the same as the positive direction of $X_2$ axis of the image plane coordinate system $X_2O_2Y_2$, and the positive direction of the $Y_1$ axis of the above screen coordinate system is the same as the positive direction of $Y_2$ axis of the image plane coordinate system $X_2O_2Y_2$.

Specifically, when solving the distortion coefficient of the optical lens, the virtual camera module in the VR display apparatus can find the corresponding screen coordinates based on the obtained image plane coordinates, for example, by fitting.

Figure 3:
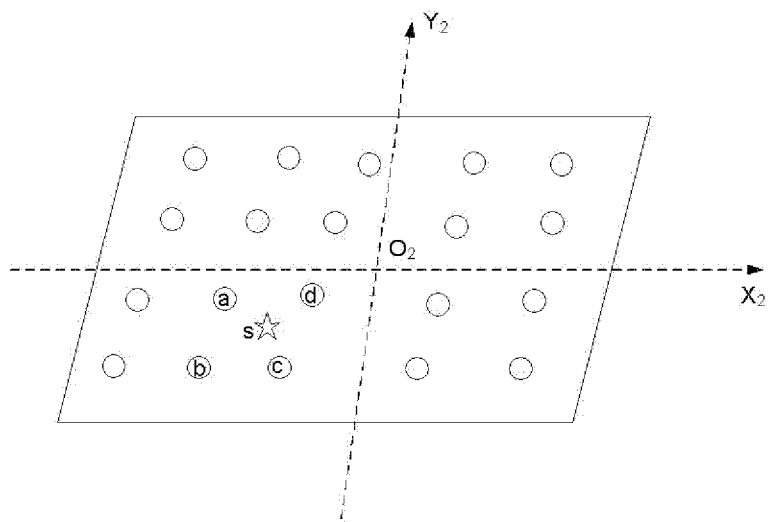
FIG. 3 is a schematic diagram of obtaining screen coordinates of a target position by fitting in the related art.

Generally speaking, before the optical lens is shipped from the factory, the manufacturer will perform optical tests on the optical lens. For example, the distortion information of different angle of view can be tested and stored, which includes screen coordinates and image plane coordinates of different angles of view. However, in actual use, the inventors found that the distortion information of different angles of view provided by the manufacturer is not accurate and needs to be recalculated. For example, as shown in FIG. 3, the screen coordinates of the first position point a, the screen coordinates of the second position point b, the screen coordinates of the third position point c, and the screen of the fourth position point d may be processed by interpolation fitting to determine the screen coordinates of the target position point s. This calculation method not only requires a large amount of data search of distortion of different angles of view, but also requires data fitting, which makes the image rendering speed relatively low, and is not conducive to the improvement of image quality.

As shown in FIG. 2, the above-mentioned angle of view refers to, taking the lens position of the image acquisition instrument as the apex F of the angle of view, the angle formed by the line connecting the apex F of the angle of view with the geometric center $O_2$ of the virtual image formed by the optical lens and the line connecting the apex F of the angle of view with the position K of the virtual image formed by the optical lens. The definition of the angle of view below is described here.

Figure 4:
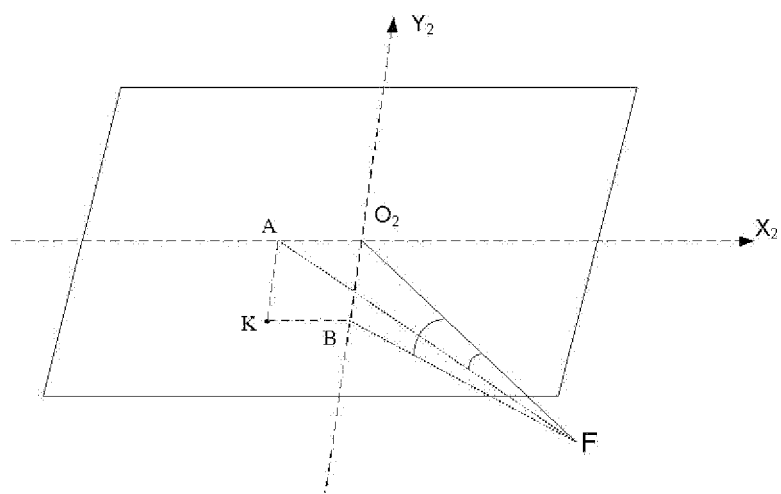
FIG. 4 is a schematic diagram showing the relationship between the image plane coordinates and the angle of view.

As shown in FIG. 4, when the angle of view is a constant value, the image plane coordinates corresponding to the angle of view are fixed. For example, the image plane coordinates (x, y) of the position K of the virtual image formed by the optical lens have a horizontal component on the $X_2$ axis and a vertical component on the $Y_2$ axis in the image coordinate system $X_2O_2Y_2$. The horizontal component corresponds to the horizontal position point A on the $X_2$ axis, and the vertical component corresponds to the vertical position point B on the $Y_2$ axis. The angle of view Fx of the horizontal position point A is defined as the horizontal component of the angle of view coordinate, and the angle of view Fy of the vertical position point B is defined as the vertical component of the angle of view coordinate. At this time, the angle of view coordinates are (FOVx, FOVy).

As shown in FIG. 5 and FIG. 7 to FIG. 9, an embodiment of the present disclosure provides an optical distortion measuring apparatus 100 for measuring distortion information of an optical lens for use in anti-distortion processing of a VR image. The optical distortion measuring apparatus 100 includes: a receiving module 110, a processing module 120, and a coordinate output module 130.

The receiving module 110 is configured to receive target field of view information.

The processing module 120 connected to the receiving module 110 is configured to process the target field of view information using a coordinate conversion model to obtain screen coordinates of a target angle of view; the coordinate conversion model is used to convert image plane coordinates an angle of view to screen coordinates of the same angle of view.

The coordinate output module 130 connected to the processing module 120 is configured to output at least screen coordinates of the target angle of view.

In one embodiment, the receiving module 110 receives the target field of view information, and the processing module 120 processes the target field of view information using a coordinate conversion model to obtain screen coordinates of the target angle of view; The coordinate output module 130 outputs at least screen coordinates of the target angle of view; wherein the coordinate conversion model can convert the image plane coordinates an angle of view to screen coordinates of the same angle of view.

Based on the specific implementation process of the optical distortion measuring apparatus 100, the coordinate conversion model can convert the image plane coordinates of an angle of view into screen coordinates of the same angle of view, and the processing module 120 can process the target field of view information using the coordinate conversion model to get the screen coordinates of the target angle of view. As such, in solving the actual distortion of the optical lens, it is only necessary to provide a plurality of target field of view information to the optical distortion measuring apparatus 100 according to actual needs and the optical distortion measuring apparatus 100 can correspondingly output screen coordinates of the plurality of target angle of view. Then, the actual distortion coefficient of the optical lens may be obtained using the screen coordinates of the plurality of target angles of view and the known image plane coordinates of the target angle of view. It can be seen that the optical distortion measuring apparatus 100 provided by the embodiment of the present disclosure can directly calculate the screen coordinates of the required target angle of view using the coordinate conversion model to further solve the actual distortion coefficient or parameter of the optical lens without having to retrieve a large amount of theoretical field of view information and perform data fitting. Therefore, the optical distortion measuring apparatus 100 provided by the embodiment of the present disclosure is advantageous in increasing image rendering speed, thereby improving image quality.

Figure 5:
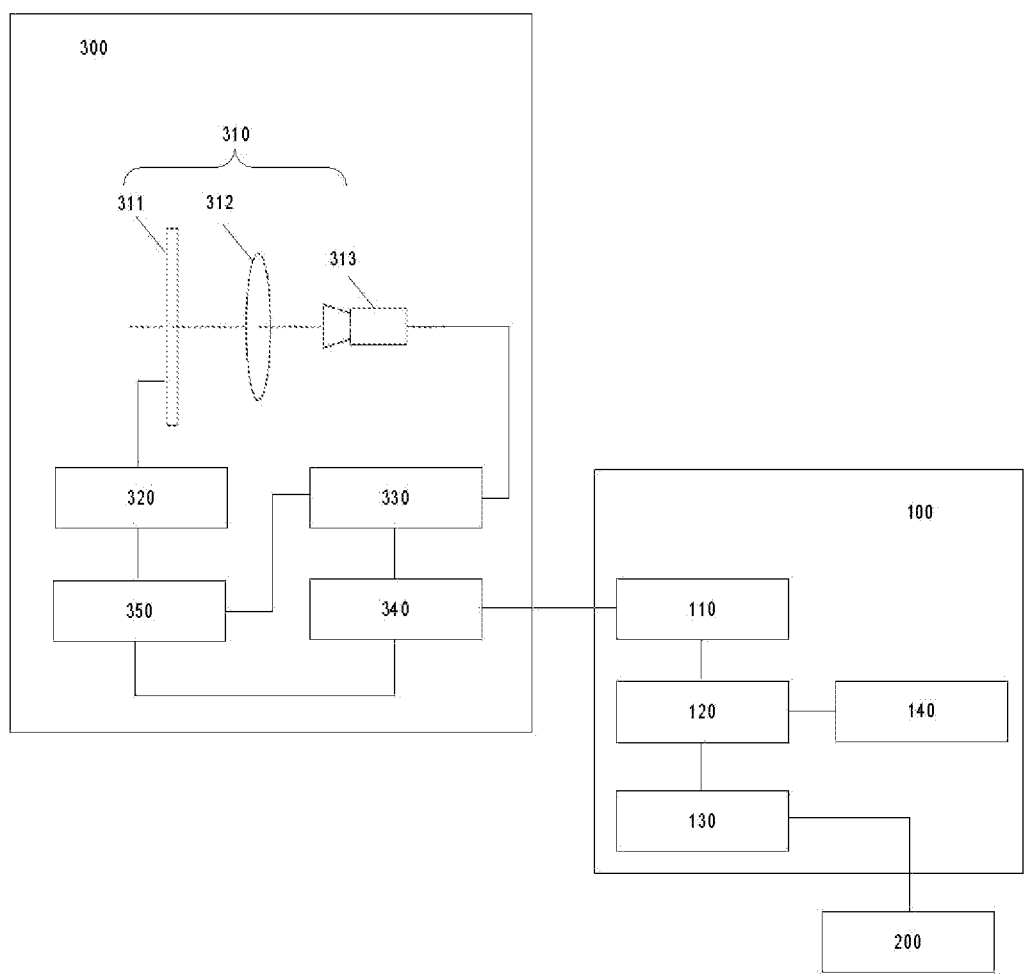
FIG. 5 is a schematic diagram of an image processing system according to an embodiment of the present disclosure.
Figure 8:
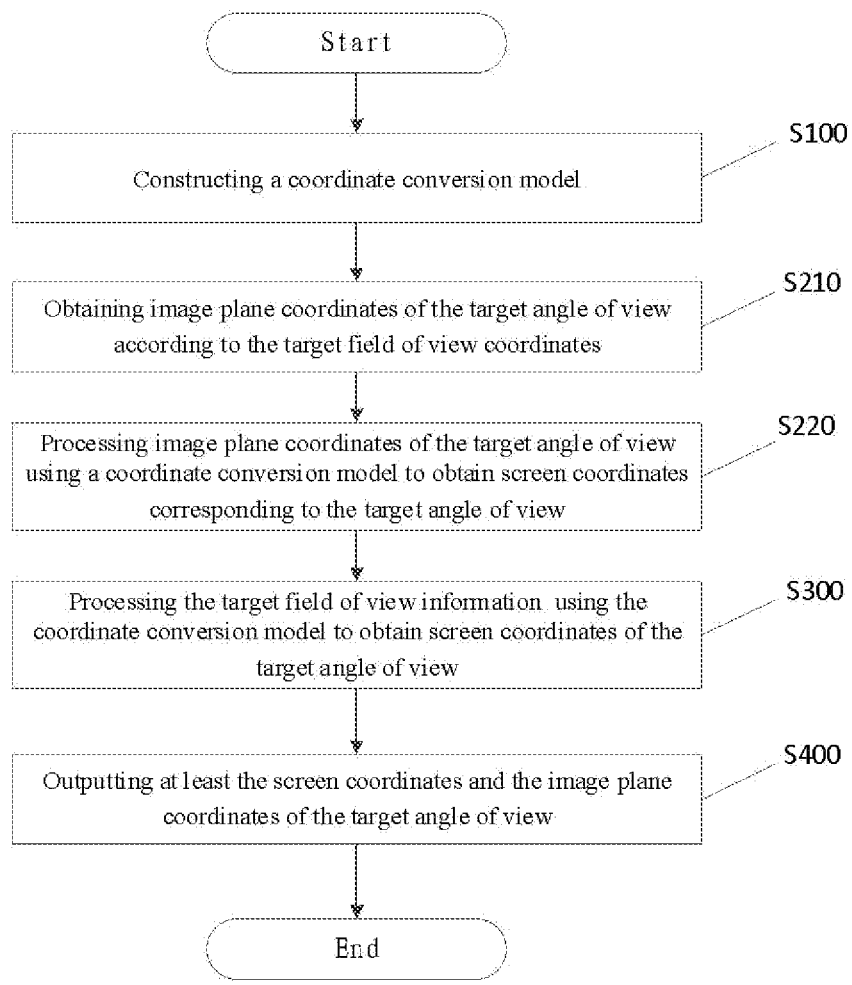
FIG. 8 is a second flowchart of an optical distortion measurement method according to an embodiment of the present disclosure.

In some embodiments, as shown in FIG. 5 and FIG. 8, the target field of view information is target angle of view coordinates. At this time, the processing module 120 is specifically configured to obtain image plane coordinates of the target angle of view according to the target angle of view coordinates; the image plane coordinates of the target angle of view are processed by the coordinate conversion model to obtain the screen coordinates corresponding to the target angle of view. For example, the known target angle of view coordinates are (aim-FOVx, aim-FOVy), and the horizontal component aim-X of the image plane coordinates of the target position point can be found according to aim-FOVx, and the vertical component aim-Y of the image plane coordinates of the target position point can be found according to aim-FOVy, and the image plane coordinates (aim-X, aim-Y) of the target position point can be obtained at this time.

In addition, as shown in FIG. 5 and FIG. 8, the coordinate output module 130 is further configured to output image plane coordinates of the target angle of view to facilitate distortion information integration.

Figure 9:
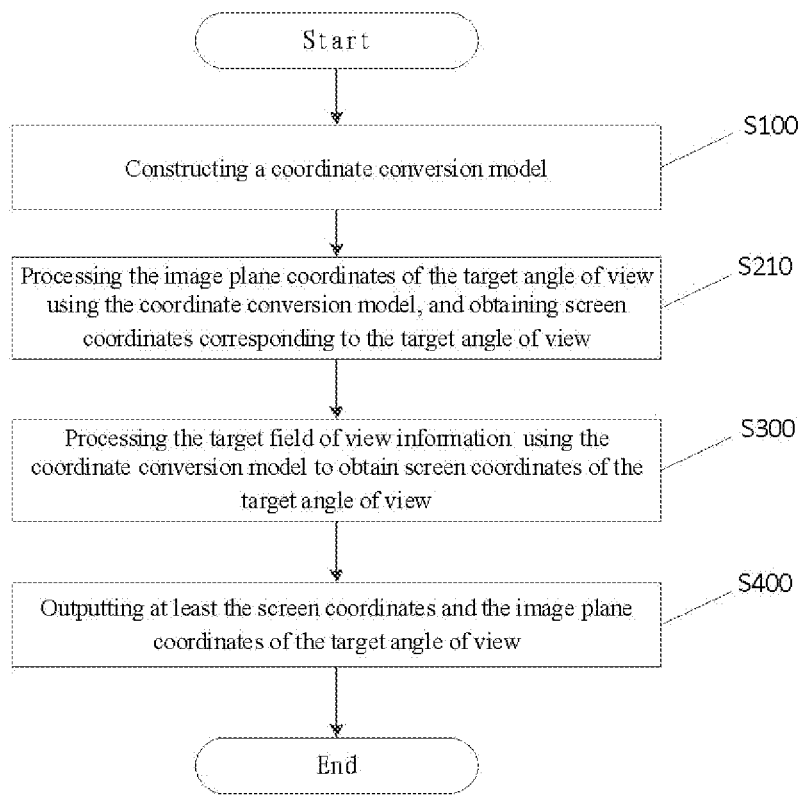
FIG. 9 is a third flowchart of an optical distortion measurement method according to an embodiment of the present disclosure.

In some embodiments, as shown in FIG. 5 and FIG. 9, the target field of view information is the image plane coordinates of the target angle of view. At this time, the processing module 120 is specifically configured to process the image plane coordinates of the target angle of view using a coordinate conversion model to obtain screen coordinates corresponding to the target angle of view. At the same time, the coordinate output module 130 is further configured to output image plane coordinates of the target angle of view to facilitate distortion information integration.

In addition, as shown in FIG. 5 and FIG. 9, the coordinate output module 130 is further configured to output image plane coordinates of the target angle of view to facilitate distortion information integration. At this time, the coordinate output module 130 is further connected to the receiving module 110.

In some embodiments, the coordinate conversion model described above is constructed using a neural network, which is connected by a number of adjustable connection weights of neurons. The coordinate conversion model has the characteristics of massive parallel processing, distributed information storage, good self-organizing and self-learning ability. Back Propagation (BP) algorithm, also known as error back propagation algorithm, is a supervised learning algorithm in artificial neural networks. The BP neural network algorithm can theoretically approximate any arbitrary function. The basic structure of the BP neural network algorithm consists of nonlinear changing units and has strong nonlinear mapping ability. Moreover, the number of intermediate layers of the network, the number of processing units of each layer, and the learning coefficient of the network can be set according to specific conditions, and the flexibility is great. It has broad application prospects in many fields such as optimization, signal processing, pattern recognition, intelligent control, and fault diagnosis.

Figure 6A:
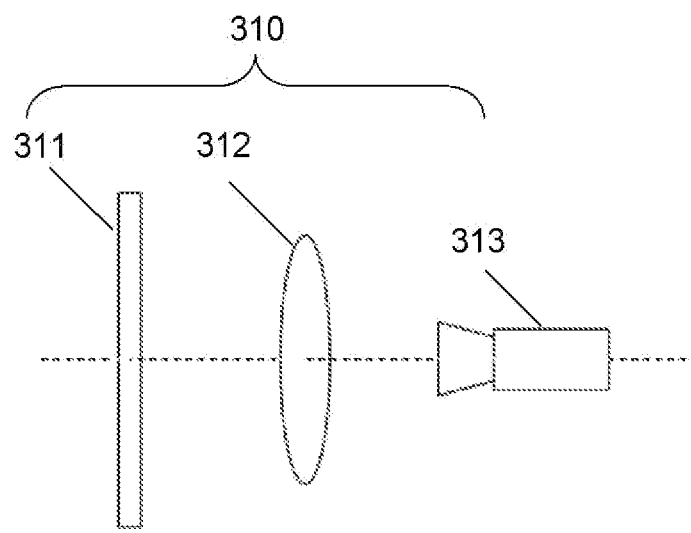
FIG. 6A is a schematic structural diagram of a sample collection apparatus according to an embodiment of the present disclosure.
Figure 6B:
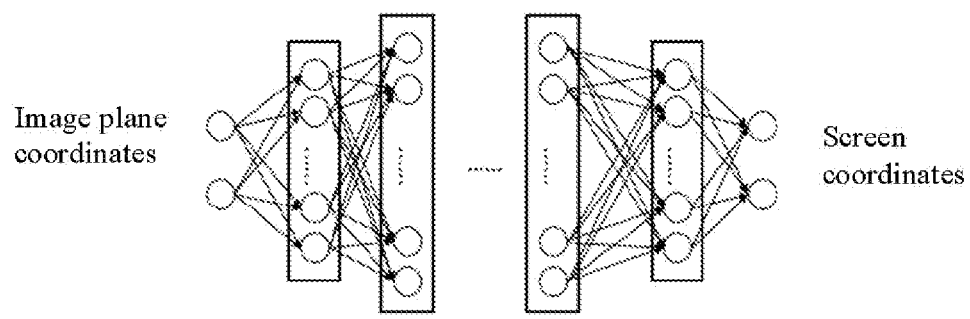
FIG. 6B is a schematic diagram of a deep neutral network structure according to an embodiment of the present disclosure.

As shown in FIG. 6B, in one embodiment, a deep neural network structure is provided to convert image plane coordinates to screen coordinates. FIG. 6B shows an input layer, multiple hidden layers, and an output layer. The image plane coordinates are inputted to the input nodes of the deep neural network structure. Each node in FIG. 6B computes an output with an activation function, and the linear combinations of the outputs are linked to the next hidden layers. After multiple layer computation, the deep neural network outputs the converted coordinates, the screen coordinates.

The following is a description of the implementation of the coordinate conversion model used in one embodiment of the present disclosure. The following is for illustrative purposes only and is not intended to be limiting.

Figure 10:
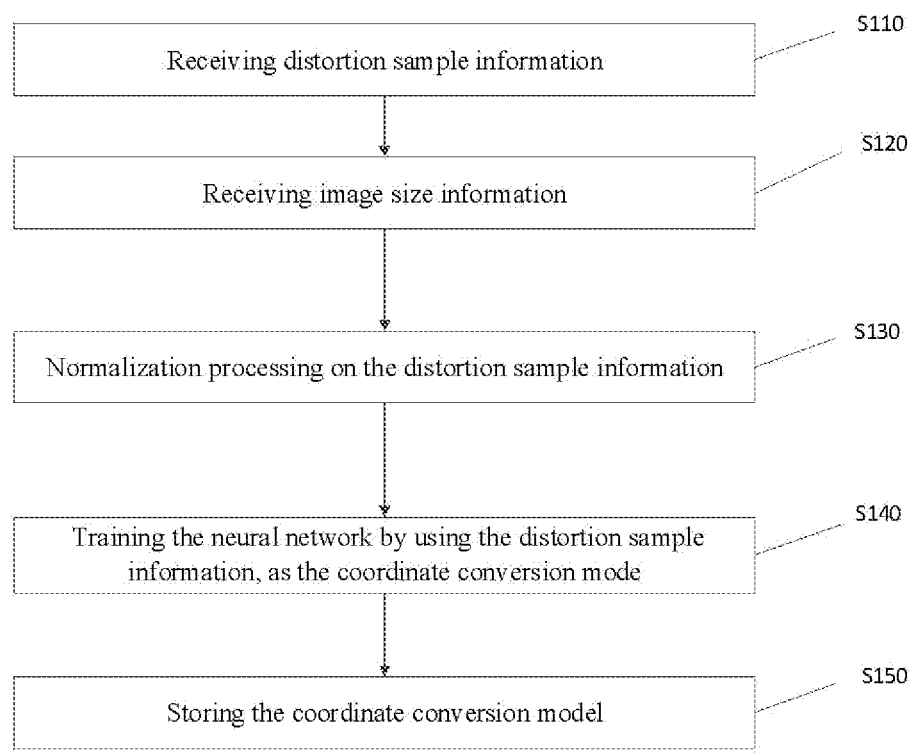
FIG. 10 is a fourth flowchart of an optical distortion measurement method according to an embodiment of the present disclosure.

As shown in FIG. 5 and FIG. 10, the receiving module 110 is further configured to receive distortion sample information before receiving the target field of view information; The distortion sample information includes image plane sample coordinates of a plurality of sample angles of view and corresponding screen sample coordinates.

The processing module 120 is further configured to train the neural network by using the distorted sample information, and the neural network formed by the training is used as the coordinate conversion model, so that the input value of the coordinate conversion model is the image plane coordinates, and the output value is the screen coordinates.

As shown in FIG. 5 and FIG. 10, the optical distortion measuring apparatus 100 further includes a model storage module 140 connected to the processing module 120 for storing a coordinate conversion model that is completed, so as to facilitate calling the coordinate conversion model for coordinate conversion in the subsequent use.

For example, the data format of the coordinate conversion model is generally saved in the .pb file format (the file format generated by the Tensorflow training neural network model) to facilitate data loading and use.

In some embodiments, the neural network employs a fully connected neural network.

For example, the activation function f(y) of the neural network is:

$$f(y) = \frac{1}{1+e^{-y}};$$

y is the input value of the neuron. For example, when the input value of the coordinate conversion model is the image plane coordinates, the output value is the screen coordinates. Setting $y_i^{(k)}$ as the input value of the i-th neuron contained in the k-th layer of neurons, then $y_i^{(k)}$ should be equal to the sum of the product of the offset value of the k−1th layer neuron, the output value of each neuron contained in the k−1th layer neuron and its weight.

For example, the loss function $E_{total}$ of a neural network is:

$$E_{total} = \frac{\sum_{i=1}^{n}(T_i - O_i)}{n},$$

n is the number of neurons in the last layer of neurons, i is the i-th neuron contained in the last layer of neurons, $T_i$ is the actual output value of the i-th neuron contained in the last layer of neurons, $O_i$ is the predicted output value of the i-th neuron contained in the last layer of neurons.

In some embodiments, as shown in FIG. 5 and FIG. 10, the receiving module 110 is further configured to receive image size information after receiving the distortion sample information. The image size information includes the number of pixels, $M_0$, along the X direction of the screen coordinate system and the number of pixels, $N_0$, along the Y-axis direction of the screen coordinate system.

The processing module 120 is further configured to perform normalization processing on the distortion sample information before training the neural network, so that the image plane sample coordinates included in the distortion sample information before the normalization processing are $(X_{s10}, Y_{s10})$, the image plane sample coordinates included in the distortion sample information after the normalization processing are $(X_{s1}, Y_{s1})$, the screen sample coordinates included in the distortion sample information before the normalization processing are $(X_{p10}, Y_{p10})$, the screen sample coordinates included in the distortion sample information after the normalization processing are $(X_{p1}, Y_{p1})$, $X_{s1}=X_{s10}/M_0$, $Y_{s1}=Y_{s10}/N_0$, $X_{p1}=X_{p10}/M_0$, $Y_{p1}=Y_{p10}/N_0$.

Normalizing the distortion sample information can simplify the distortion sample information and improve the training speed of the neural network.

For example, the screen has a pixel array of 2000×2000, the horizontal direction of the pixel array is parallel to the $X_1$ axis of the screen coordinate system, and the vertical direction of the pixel array is parallel to the $Y_1$ axis direction of the screen coordinate system; Assuming that the image plane coordinates of the pixels in the third row and the eighteenth column are (3, 18), the image plane coordinates of the pixels in the third row and the eighteenth column after the normalization processing are (3/2000, 18/2000), ie (0.0015, 0.009).

It can be understood that the number of neurons included in the coordinate conversion model includes an input layer, an output layer, and an intermediate hidden layer. The intermediate hidden layer includes at least the dropout layer, and the dropout layer refers to a layer that does not discard any parameters of the network, and is equivalent to a layer outputting what is inputted.

In some embodiments, the process of normalization described above is introduced into the neural network such that the intermediate hidden layer also contains a normalized layer.

In some embodiments, a 7-layer fully connected neural network is employed.

Figure 7:
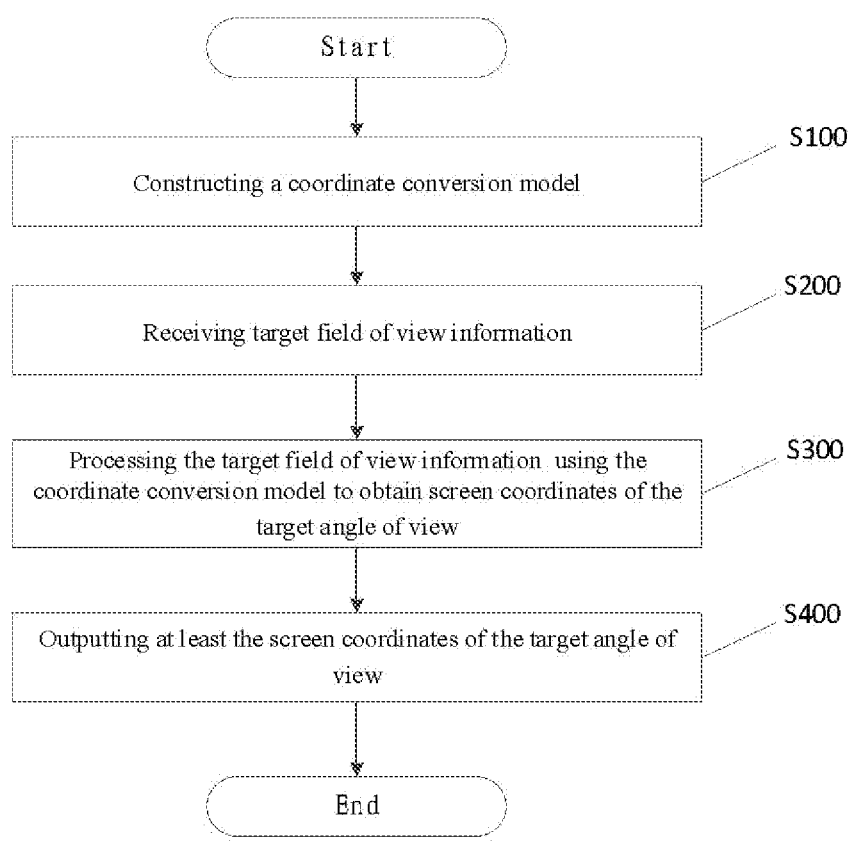
FIG. 7 is a first flowchart of an optical distortion measurement method according to an embodiment of the present disclosure.

As shown in FIG. 7 to FIG. 9, an embodiment of the present disclosure further provides an optical distortion measurement method, where the optical distortion measurement method includes:

Step S100: constructing a coordinate conversion model;
Step S200: receiving target field of view information;
Step S300: processing the target field of view information using the coordinate conversion model to obtain screen coordinates of the target angle of view; the coordinate conversion model is configured to convert image plane coordinates angle of view to screen coordinates of the same angle of view;
Step S400: outputting at least the screen coordinates of the target angle of view.

The beneficial effects of the optical distortion measuring method provided by the embodiment of the present disclosure are the same as those of the optical distortion measuring apparatus 100 shown in FIG. 5, and are not described herein.

In some embodiments, as shown in FIG. 8, the target field of view information is target angle of view coordinates; at this time, processing the target field of view information using a coordinate conversion model to obtain the screen coordinates of the target angle of view includes:

Step S210: obtaining image plane coordinates of the target angle of view according to the target field of view coordinates.

Step S220: processing image plane coordinates of the target angle of view using a coordinate conversion model to obtain screen coordinates corresponding to the target angle of view.

Further, as shown in FIG. 8, when at least the screen coordinates of the target angle of view are output, the optical distortion measuring method further includes: outputting the image plane coordinates of the target angle of view.

In some embodiments, as shown in FIG. 9, the target field of view information is image plane coordinates of a target angle of view; At this time, processing the target field of view information using a coordinate conversion model to obtain the screen coordinates of the target angle of view includes:

Step S210: processing the image plane coordinates of the target angle of view using the coordinate conversion model, and obtaining screen coordinates corresponding to the target angle of view.

Further, as shown in FIG. 9, when at least the screen coordinates of the target angle of view are output, the optical distortion measuring method further includes: outputting the image plane coordinates of the target angle of view.

In some embodiments, as shown in FIG. 10, the specific method for constructing a coordinate network model includes:

Step S110: receiving distortion sample information, where the distortion sample information includes image plane sample coordinates of a plurality of sample angles of view and corresponding screen sample coordinates;

Step S140: training the neural network by using the distortion sample information, and training the formed neural network as the coordinate conversion model;

Step S150: storing the coordinate conversion model.

For example, the activation function f(y) of the neural network is:

$$f(y) = \frac{1}{1+e^{-y}};$$

y is the input value of the neuron.

For example, the loss function of a neural network $E_{total}$ is:

$$E_{total} = \frac{\sum_{i=1}^{n}(T_i - O_i)}{n},$$

n is the number of neurons in the last layer of neurons, i is the i-th neuron contained in the last layer of neurons, $T_i$ is the actual output value of the i-th neuron contained in the last layer of neurons, $O_i$ is the predicted output value of the i-th neuron contained in the last layer of neurons.

In some embodiments, as shown in FIG. 10, after receiving the distortion sample information, the optical distortion measurement method further includes:

Step S120: receiving image size information, which includes the number of pixels, $M_0$, along the X direction of the screen coordinate system and the number of pixels, $N_0$, along the Y-axis direction of the screen coordinate system.

Step S130: normalization processing on the distortion sample information, so that the image plane sample coordinates included in the distortion sample information before the normalization processing are $(X_{s10}, Y_{s10})$, the image plane sample coordinates included in the distortion sample information after the normalization processing are $(X_{s1}, Y_{s1})$, the screen sample coordinates included in the distortion sample information before the normalization processing are $(X_{p10}, Y_{p10})$, the screen sample coordinates included in the distortion sample information after the normalization processing are $(X_{p1}, Y_{p1})$, $X_{s1}=X_{s10}/M_0$, $Y_{s1}=Y_{s10}/N_0$, $X_{p1}=X_{p10}/M_0$, $Y_{p1}=Y_{p10}/N_0$.

In some embodiments, as shown in FIG. 5, the optical distortion measuring apparatus 100 further includes (connected or integrated together) a distortion calculating module 200. The input of the distortion calculation module 200 is coupled to the coordinate output module 130 included in the optical distortion measuring apparatus 100. The distortion calculating module is configured to calculate the distortion coefficient or parameter based on the image plane coordinates of the plurality of sets of target angles of view and the corresponding screen coordinates.

Figure 11:
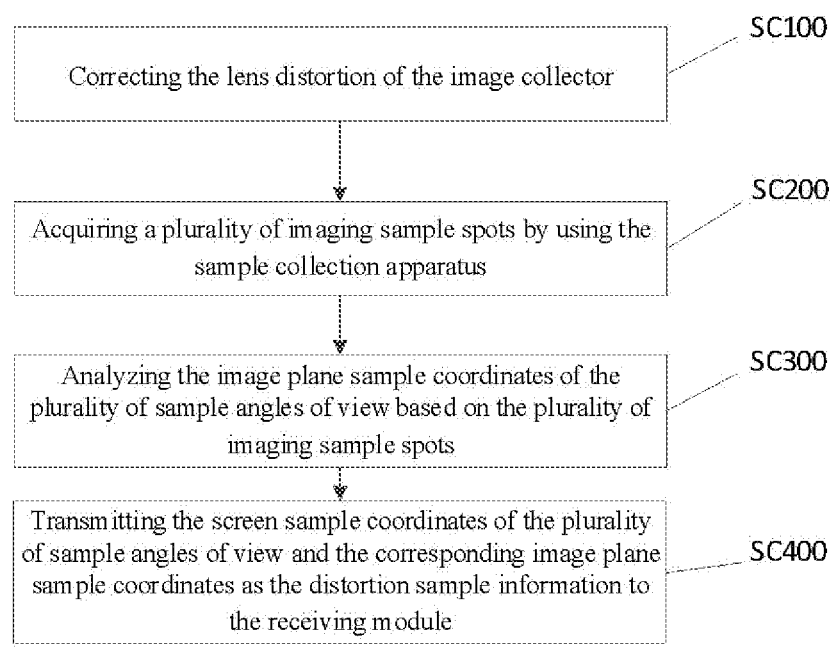
FIG. 11 is a first flowchart of execution of a sample collection apparatus according to an embodiment of the present disclosure.

In some embodiments, as shown in FIG. 5, FIG. 6A, and FIG. 11, an embodiment of the present disclosure provides an image processing system including a sample collection apparatus 300 and an optical distortion measurement apparatus 100 connected thereto. The sample collection apparatus 300 includes:

a display setting module 320, configured to set screen sample coordinates of a plurality of sample angles of view.

In one embodiment, the sample collection apparatus 310 includes a display screen 311, an image collector 313, and an optical lens 312 located between the display screen 311 and the image collector 313. The display screen 311 is connected to a display setting module 320, and the display screen 311 is used for displaying a plurality of screen sample spots according to screen sample coordinates of a plurality of sample angles of view. The image collector 313 is configured to collect a plurality of imaging sample spots formed by the plurality of screen sample spots passing through the optical lens 312. The types of image collectors 313 are various. In general, the image collector 313 can be a camera, a video camera, etc., and the lens configured therein is a wide-angle lens.

The image analysis module 330 connected to the image collector 313 is configured to analyze the image plane sample coordinates of the plurality of sample angles of view according to the plurality of imaging sample spots.

The sample output module 340 connected to the receiving module 110 included in the optical distortion measuring apparatus 100 is configured to transmit the screen sample coordinates of the plurality of sample angle of view and the corresponding image plane sample coordinates as the distortion sample information to the receiving module 110.

For example, in order to eliminate the interference of the mounting error of the optical lens 312 on the distortion, the optical axis of the optical lens 312, the optical axis of the lens of the image collector 313, and the geometric center of the display screen 311 are coaxial.

Figure 12:
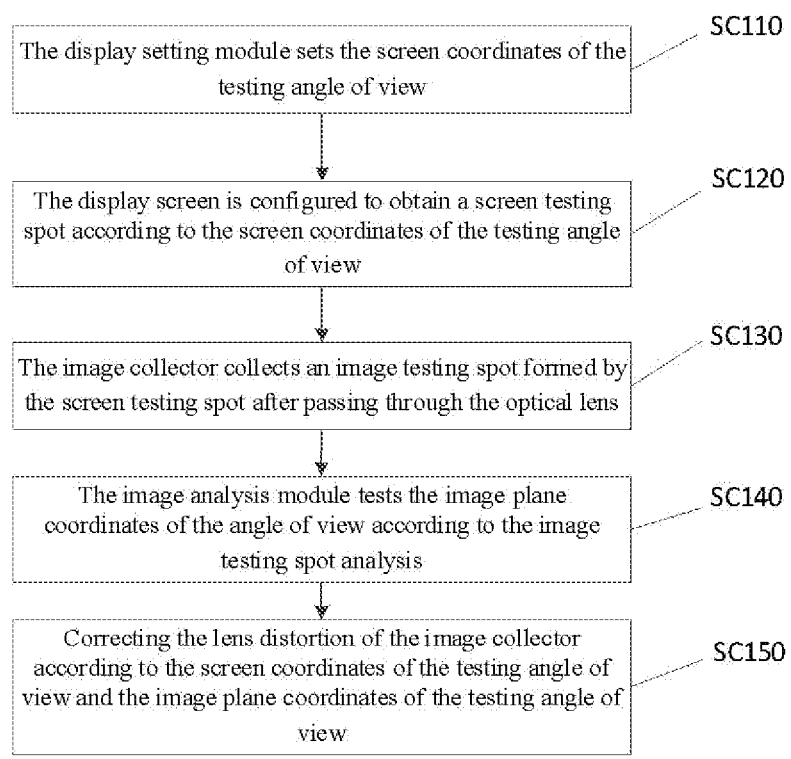
FIG. 12 is a second flowchart of execution of a sample collection apparatus according to an embodiment of the present disclosure.
Figure 13:
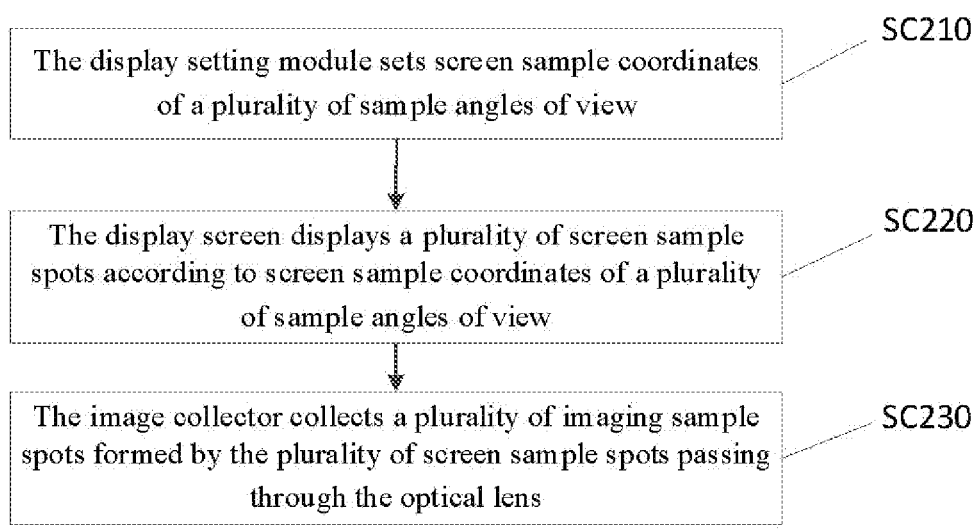
FIG. 13 is a third flowchart of execution of a sample collection apparatus according to an embodiment of the present disclosure.

For example, as shown in FIG. 5, FIG. 12 and FIG. 13, in order to prevent the distortion sample information from being affected by the distortion of the lens of the image collector 313, the lens of the image collector 313 needs to be corrected for distortion before the distortion sample information is collected. In one embodiment, when the distortion correction is performed, the display setting module 320 is configured to set the screen coordinates of the testing angle of view before setting the screen sample coordinates of the plurality of sample angle of view; The display screen 311 is configured to obtain a screen testing spot according to the screen coordinates of the testing angle of view; the image collector 313 is further configured to collect an image testing spot formed by the testing spot after passing through the optical lens 312; The image analysis module 330 is further configured to test the image plane coordinates of the angle of view according to the image testing spot analysis; The lens distortion of the image collector 313 is corrected based on the screen coordinates of the testing angle of view and the image plane coordinates of the testing angle of view.

In one embodiment, the specific implementation process of the sample collection apparatus 300 described above will be described in detail below with reference to FIG. 5 and FIG. 11 to FIG. 13. The following is for illustrative purposes only and is not intended to be limiting.

Step SC100: correcting the lens distortion of the image collector 313, which, in one embodiment, includes the following steps SC110 to SC 150:

In step SC110, the display setting module 320 sets the screen coordinates of the testing angle of view.

In step SC120, the display screen 311 is configured to obtain a screen testing spot according to the screen coordinates of the testing angle of view.

In step SC130, the image collector 313 collects an image testing spot formed by the screen testing spot after passing through the optical lens 312.

In step SC140, the image analysis module 330 tests the image plane coordinates of the angle of view according to the image testing spot analysis.

Step S150 includes correcting the lens distortion of the image collector 313 according to the screen coordinates of the testing angle of view and the image plane coordinates of the testing angle of view.

For example, the display setting module 320 can be used to display a white point on any position of the display screen 311, and the screen coordinates of the white point can be set to limit the display position of the white point on the screen. The white point passes through the optical lens 312 to form a white point virtual image, the image collector 313 collects the white point virtual image, and uses the image analysis module 330 to analyze the image plane coordinates of the white point virtual image.

Step SC200: acquiring a plurality of imaging sample spots by using the sample collection apparatus 310, and, in one embodiment, obtain the plurality of imaging sample spots, which may be acquired one by one or simultaneously, specifically includes the following steps SC210 to SC230:

In step SC210, the display setting module 320 sets screen sample coordinates of a plurality of sample angles of view.

In step SC220, the display screen 311 displays a plurality of screen sample spots according to screen sample coordinates of a plurality of sample angles of view.

In step SC230, the image collector 313 collects a plurality of imaging sample spots formed by the plurality of screen sample spots passing through the optical lens 312.

In step SC300, the image analysis module 330 analyzes the image plane sample coordinates of the plurality of sample angles of view based on the plurality of imaging sample spots.

In step SC400, the sample output module 340 transmits the screen sample coordinates of the plurality of sample angles of view and the corresponding image plane sample coordinates as the distortion sample information to the receiving module 110.

It can be understood that the sample collection apparatus 300 further includes a sample storage module 350 for storing the distortion sample information before the sample output module 340 transmits the screen sample coordinates of the plurality of sample angles of view and the corresponding image plane sample coordinates as the distortion sample information to the receiving module 110 when the distortion sample information does not reach the required number of samples.

The functions implemented by the display setting module 320, the image analysis module 330 and the sample output module 340 described above may be implemented by one processor or several processors. Of course, the above display setting module 320, image analysis module 330, and sample output module 340 and the receiving module 110, the processing module 120 and the coordinate output module 130 can also be implemented by one processor or several processors. The processor may be a central processing unit (CPU) or an application specific integrated circuit (ASIC), or one or more integrated circuits configured to implement the method or function of the embodiments of the present disclosure, such as a digital signal processor (DSP), or a Field Programmable Gate Array (FPGA).

Embodiments of the present disclosure also provide an electronic apparatus including a processor and a memory, wherein the memory stores a calculation instruction, and the processor is configured to execute the calculation instruction to perform the optical distortion measurement method described above.

Figure 14:
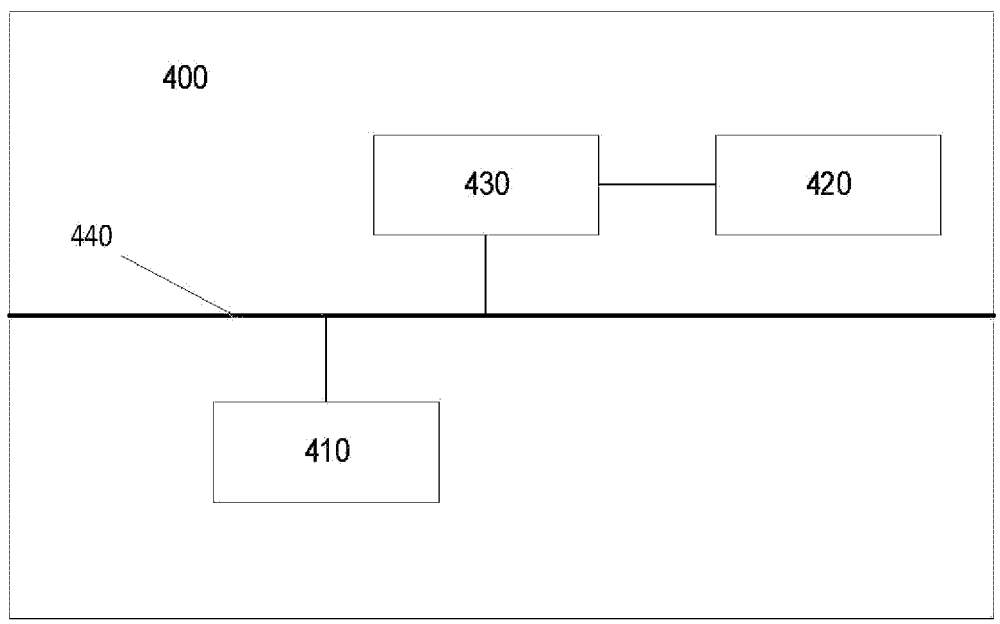
FIG. 14 is a hardware frame diagram of an image-processing terminal according to an embodiment of the present disclosure.

In one embodiment, the electronic apparatus, for example, may be an image processing terminal as shown in FIG. 14, the image processing terminal includes a transceiver 410, a memory 420, a processor 430, and a bus 440. The transceiver 410, the memory 420, and the processor 430 communicate with one another via the bus 440.

The memory 420 is configured to store a plurality of instructions to implement the image processing method described above, and the processor 430 is configured to execute the plurality of instructions to implement the functions of the optical distortion measuring apparatus 100 or the functions of the image processing system.

The processor 430 in one embodiment of the present disclosure may be a processor or a collective name of multiple processing elements. For example, the processor 430 can be a central processing unit (CPU), an application specific integrated circuit (ASIC), or one or more integrated circuits configured to implement embodiments of the present disclosure, such as digital processor (DSP), or field programmable gate array (FPGA).

The memory 420 may be a storage apparatus or a collective name of a plurality of storage elements, and is used to store executable program code or the like. The memory may include random access memory (RANI), and may also include non-volatile memory such as a magnetic disk memory, a flash memory, or the like.

The bus 440 may be an Industry Standard Architecture (ISA) bus, a Peripheral Component (PCI) bus, or an Extended Industry Standard Architecture (EISA) bus and the like. The bus 440 can be divided into an address bus, a data bus, a control bus, and the like. For ease of representation, only one thick line is shown in FIG. 14, but it does not mean that there is only one bus or one type of bus.

The various embodiments in the specification are described in a progressive manner, and the same or similar parts between the various embodiments may be referred to each other, and each embodiment focuses on the differences from the other embodiments. In particular, for the apparatus embodiment, since it is basically similar to the method embodiment, the description is relatively simple, and the relevant parts can be referred to the description of the method embodiment.

One embodiment of the disclosure further provides a display apparatus, which comprises the above electronic apparatus.

The display apparatus provided in the foregoing embodiment may be any product or component having a display function, such as a mobile phone, a tablet computer, a television, a display, a notebook computer, a digital photo frame, or a navigator.

In some embodiments, the sample collection apparatus 300 described above collects the distortion sample information of an optical lens 312. As long as the optical lens used in the display apparatus is the same as the optical lens of the sample collection apparatus 310, the display apparatus can process the image by using the optical distortion-testing apparatus or the image processing system provided by one embodiment of the present disclosure, which has high applicability. Of course, if the optical lens used by the display apparatus is different from the optical lens of the sample collection apparatus 310, the display apparatus can still process the image by using the optical distortion testing apparatus or the image processing system provided by one embodiment of the present disclosure, simply by replacing the optical lens of the sample collection tool 310 with the optical lens used by the display apparatus.

The above description is only a specific embodiment of the present disclosure, but the scope of protection of the present disclosure is not limited thereto. Variations or substitutions readily conceivable by those skilled in the art are within the scope of the present disclosure. Therefore, the scope of the disclosure should be determined by the scope of the appended claims.

What is claimed is:

1. An optical distortion measurement method, comprising:
    receiving target field of view information;
    processing the target field of view information using a coordinate conversion model to obtain screen coordinates of a target angle of view, wherein the coordinate conversion model is configured to convert image plane coordinates of the target angle of view to screen coordinates of the target angle of view; and
    outputting at least the screen coordinates of the target angle of view.

2. The optical distortion measurement method according to claim 1, wherein processing the target field of view information using the coordinate conversion model to obtain the screen coordinates of the target angle of view, comprising:
    obtaining the image plane coordinates of the target angle of view; and
    processing the image plane coordinates of the target angle of view using the coordinate conversion model to obtain the screen coordinates of the target angle of view.

3. The optical distortion measurement method according to claim 2,
    wherein outputting at least the screen coordinates of the target angle of view further comprising:
    outputting the image plane coordinates of the target angle of view.

4. The optical distortion measuring method according to claim 1, before the receiving the target field of view information, further comprising:
    receiving distortion sample information, which comprises image plane sample coordinates of a plurality of sample angles of view and corresponding screen sample coordinates;
    training a neural network as the coordinate conversion model using the distortion sample information; and
    storing the coordinate conversion model.

5. The optical distortion measuring method according to claim 4, further comprising:
    receiving image size information after receiving the distortion sample information; the image size information comprising $M_0$ pixels along X axis direction of a screen coordinate system and $N_0$ pixels along Y axis direction of the screen coordinate system; and
    performing normalization processing on the distortion sample information, so that the image plane sample coordinates included in the distortion sample information before the normalization processing are ($X_{s10}$, $Y_{s10}$) the image plane sample coordinates included in the distortion sample information after the normalization processing are ($X_{s1}$, $Y_{s1}$), the screen sample coordinates included in the distortion sample information before the normalization processing are ($X_{p10}$, $Y_{p10}$), the screen sample coordinates included in the distortion sample information after the normalization processing are ($X_{p1}$, $Y_{p1}$); wherein $X_{s1}=X_{s10}/M_0$, $Y_{s1}=Y_{s10}/N_0$, $X_{p1}=X_{p10}/M_0$, $Y_{p1}=Y_{p10}/N_0$.

6. The optical distortion measuring method according to claim 4, wherein an activation function f(y) of the neural network is $$f(y) = \frac{1}{1+e^{-y}};$$

y is an input value of a neuron;
a loss function of the neural network $E_{total}$ is $$E_{total} = \frac{\sum_{i=1}^{n}(T_i - O_i)}{n},$$

n is a number of neurons in a last layer of neurons, i is the i-th neuron contained in the last layer of neurons, $T_i$ is an actual output value of the i-th neuron contained in the last layer of neurons, and $O_i$ is a predicted output value of the i-th neuron contained in the last layer of neurons.

7. An electronic apparatus, comprising: a processor and a memory, wherein the memory stores calculation instruction, the processor is configured to execute the calculation instructions to perform the optical distortion measurement method of claim 1.

8. A display apparatus, comprising the electronic apparatus of claim 7.

9. An optical distortion measuring apparatus, comprising:
a receiving module, configured to receive target field of view information;
a processing module, configured to process the target field of view information; using a coordinate conversion model to obtain screen coordinates of a target angle of view, the coordinate conversion model is configured to convert image plane coordinates of the target angle of view to the screen coordinates of the target angle of view; and
a coordinate output module, configured to output at least the screen coordinates of the target angle of view.

10. The optical distortion measuring apparatus according to claim 9, wherein the processing module is configured to obtain the image plane coordinates of the target angle of view, and process the image plane coordinates of the target angle of view using the coordinate conversion model to obtain the screen coordinates of the target angle of view.

11. The optical distortion measuring apparatus according to claim 10, wherein the coordinate output module is further configured to output the image plane coordinates of the target angle of view.

12. The optical distortion measuring apparatus according to claim 9, wherein the receiving module is further configured to receive distortion sample information before receiving the target field of view information, the distortion sample information comprising image plane sample coordinates of a plurality of sample angles of view and corresponding screen sample coordinates;
the processing module is further configured to train a neural network as the coordinate conversion model using the distortion sample information; and
the optical distortion measuring apparatus further comprising a model storage module for storing the coordinate conversion model.

13. The optical distortion measuring apparatus according to claim 12, wherein the receiving module is further configured to receive image size information after receiving the distortion sample information, the image size information comprising $M_0$ pixels along X axis direction of a screen coordinate system and $N_0$ pixels along Y axis direction of the screen coordinate system;
the processing module is further configured to perform normalization processing on the distortion sample information before training the neural network, so that the image plane sample coordinates included in the distortion sample information before the normalization processing are ($X_{s10}$, $Y_{s10}$), the image plane sample coordinates included in the distortion sample information after the normalization processing are ($X_{s1}$, $Y_{s1}$); the screen sample coordinates included in the distortion sample information before the normalization processing are ($X_{p10}$, $Y_{p10}$), the screen sample coordinates included in the distortion sample information after the normalization processing are ($X_{p1}$, $Y_{p1}$); wherein $X_{s1}=X_{s10}/M_0$, $Y_{s1}=Y_{s10}/N_0$, $X_{p1}=X_{p10}/M_0$, $Y_{p1}=Y_{p10}/N_0$.

14. The optical distortion measuring apparatus according to claim 12, wherein an activation function f(y) of the neural network is $$f(y) = \frac{1}{1+e^{-y}};$$

y is an input value of a neuron;

a loss function of the neural network $E_{total}$ is $$E_{total} = \frac{\sum_{i=1}^{n}(T_i - O_i)}{n},$$

n is a number of neurons in a last layer of neurons, i is the i-th neuron contained in the last layer of neurons, $T_i$ is an actual output value of the i-th neuron contained in the last layer of neurons, and $O_i$ is a predicted output value of the i-th neuron contained in the last layer of neurons.

15. An image processing system, comprising a sample collection apparatus and the optical distortion measurement apparatus according to claim 12, wherein the sample collection apparatus is configured to provide the distortion sample information to the optical distortion measurement apparatus; the sample collection apparatus comprising:
a display setting module, configured to set the screen sample coordinates of the plurality of sample angles of view;
a sample collection assembly, comprising a display screen, an image collector, and an optical lens located between the display screen and the image collector; wherein the display screen is configured to display a plurality of screen sample spots according to the screen sample coordinates of the plurality of sample angles of view, the image collector is configured to collect a plurality of imaging sample spots formed after the plurality of screen sample spots passing through the optical lens;
an image analysis module, configured to analyze the image plane sample coordinates of the plurality of sample angles of view according to the plurality of imaging sample spots; and
a sample output module connected to the receiving module included in the optical distortion measuring apparatus, configured to transmit the screen sample coordinates of the plurality of sample angles of view and the corresponding image plane sample coordinates as the distortion sample information to the receiving module.

16. The image processing system according to claim 15, wherein an optical axis of the optical lens, an optical axis of a lens of the image collector, and a geometric center of the display screen are coaxial.

17. The image processing system according to claim 15, wherein the display setting module is configured to set screen coordinates of testing angles of view before setting the screen sample coordinates of the plurality of sample angles of views;
the display screen is configured to obtain a screen test spot according to the screen coordinates of the testing angles of view;
the image collector is further configured to collect an image testing spot formed by the screen testing spot after passing through the optical lens; and
the image analysis module is further configured to test the image plane coordinates of the angle of view according to the image testing spot analysis; distortion the lens of the image collector is corrected based on the screen coordinates of the testing angle of view and the image plane coordinates of the testing angles of view.

18. The optical distortion measuring apparatus according to claim 9, further comprising a distortion calculation module, wherein an input of the distortion calculation module is coupled to the coordinate output module, and configured to calculate a distortion coefficient of an optical lens according to the image plane coordinates of a plurality of target angles of view and the corresponding screen coordinates.

* * * * *